(12) United States Patent
Rajagopal et al.

(10) Patent No.: US 9,185,705 B2
(45) Date of Patent: Nov. 10, 2015

(54) APPARATUS AND METHODS FOR FLEXIBLE RF CONFIGURATION IN MULTI-ANTENNA WIRELESS SYSTEMS

(71) Applicant: Samsung Electronics Co., LTD, Suwon-si, Gyeonggi-do (KR)

(72) Inventors: Sridhar Rajagopal, Plano, TX (US); Richard Stirling-Gallacher, Dallas, TX (US); Krishna Sayana, San Jose, CA (US); Jianzhong Zhang, Plano, TX (US); Farooq Khan, Allen, TX (US)

(73) Assignee: SAMSUNG ELECTRONICS CO., LTD., Suwon-Si (KR)

(*) Notice: Subject to any disclaimer, the term of this patent is extended or adjusted under 35 U.S.C. 154(b) by 119 days.

(21) Appl. No.: 13/899,148

(22) Filed: May 21, 2013

(65) Prior Publication Data
US 2013/0336242 A1 Dec. 19, 2013

Related U.S. Application Data

(60) Provisional application No. 61/661,704, filed on Jun. 19, 2012.

(51) Int. Cl.
*H04W 80/04* (2009.01)
*H04W 52/40* (2009.01)
*H04W 72/04* (2009.01)
(Continued)

(52) U.S. Cl.
CPC .............. *H04W 72/0453* (2013.01); *H04L 5/00* (2013.01); *H04W 24/00* (2013.01); *H04B 7/0413* (2013.01); *H04B 7/068* (2013.01); *H04B 7/0669* (2013.01); *H04B 7/0671* (2013.01); *H04L 5/001* (2013.01); *H04L 27/0006* (2013.01); *H04W 84/12* (2013.01)

(58) Field of Classification Search
USPC .................................. 370/328, 329, 332, 334
See application file for complete search history.

(56) References Cited

U.S. PATENT DOCUMENTS

2009/0156227 A1 6/2009 Frerking et al.
2009/0190566 A1 7/2009 Kwon et al.
(Continued)

FOREIGN PATENT DOCUMENTS

WO WO 2009/083960 A2 7/2009

OTHER PUBLICATIONS

International Search Report dated Sep. 25, 2013 in connection with International Patent Application No. PCT/KR2013/005361, 3 pages.
(Continued)

*Primary Examiner* — Andrew Lee

(57) ABSTRACT

An apparatus includes a baseband signal processing block, processing circuitry, and at least one radio frequency (RF) communication module communicably coupled to the baseband signal processing block and configured to communicate using a selected mode of communication in a channel. The processing circuitry is configured to detect a sub-channel band of unavailable spectrum within the channel, the band of unavailable spectrum being less than a whole of the channel. The channel includes one contiguous band of frequencies divisible into at least two non-overlapping non-adjacent sub-channels. The processing circuitry is configured to select one mode of communication selected from a plurality of modes including: a carrier aggregation (CA) only mode, a multiple input multiple output (MIMO) only mode, and a carrier aggregation multiple input multiple output (CA-MIMO) hybrid mode.

21 Claims, 11 Drawing Sheets

(51) Int. Cl.
*H04L 5/00* (2006.01)
*H04W 24/00* (2009.01)
*H04W 84/12* (2009.01)
*H04B 7/04* (2006.01)
*H04B 7/06* (2006.01)
*H04L 27/00* (2006.01)

(56) References Cited

U.S. PATENT DOCUMENTS

| | | |
|---|---|---|
| 2011/0038272 A1 | 2/2011 | Hadad et al. |
| 2011/0096739 A1* | 4/2011 | Heidari et al. ............... 370/329 |
| 2011/0103243 A1 | 5/2011 | Larsson et al. |
| 2012/0182874 A1* | 7/2012 | Siomina et al. ............. 370/241 |
| 2012/0281597 A1* | 11/2012 | Khlat et al. .................. 370/277 |
| 2013/0223215 A1* | 8/2013 | Brown et al. ................ 370/230 |
| 2013/0223427 A1* | 8/2013 | Sohn et al. ................... 370/338 |
| 2013/0230080 A1* | 9/2013 | Gudem et al. ............... 375/219 |
| 2013/0231064 A1* | 9/2013 | Gudem et al. ................. 455/73 |
| 2013/0329665 A1* | 12/2013 | Kadous et al. .............. 370/329 |
| 2014/0133411 A1* | 5/2014 | Park et al. .................... 370/329 |

OTHER PUBLICATIONS

Written Opinion of International Searching Authority dated Sep. 25, 2013 in connection with International Patent Application No. PCT/KR2013/005361, 6 pages.

Robert H. Morelos-Zaragoza; "Cognitive Radio: Fundamentals and Opportunities"; San Jose State University; Electrical Engineering Department; Oct. 12, 2007; 19 pages.

* cited by examiner

| NUMBER OF STREAMS | BANDWIDTH | | | |
|---|---|---|---|---|
| | 20 MHz | 40 MHz | 80 MHz | 160 MHz |
| 1 | 86.7 Mb/s | 200 Mb/s | 433.3 Mb/s | 866.7 Mb/s |
| 2 | 173.3 Mb/s | 400 Mb/s | 866.7 Mb/s | 1733 Mb/s |
| 3 | 288.9 Mb/s | 600 Mb/s | 1300 Mb/s | 2340 Mb/s |
| 4 | 346.7 Mb/s | 800 Mb/s | 1733 Mb/s | 3466 Mb/s |
| 5 | 433.3 Mb/s | 1000 Mb/s | 2166 Mb/s | 4333 Mb/s |
| 6 | 577.8 Mb/s | 1200 Mb/s | 2340 Mb/s | 5200 Mb/s |
| 7 | 606.7 Mb/s | 1400 Mb/s | 3033 Mb/s | 6066.7 Mb/s |
| 8 | 693.3 Mb/s | 1600 Mb/s | 3466 Mb/s | 6933 Mb/s |

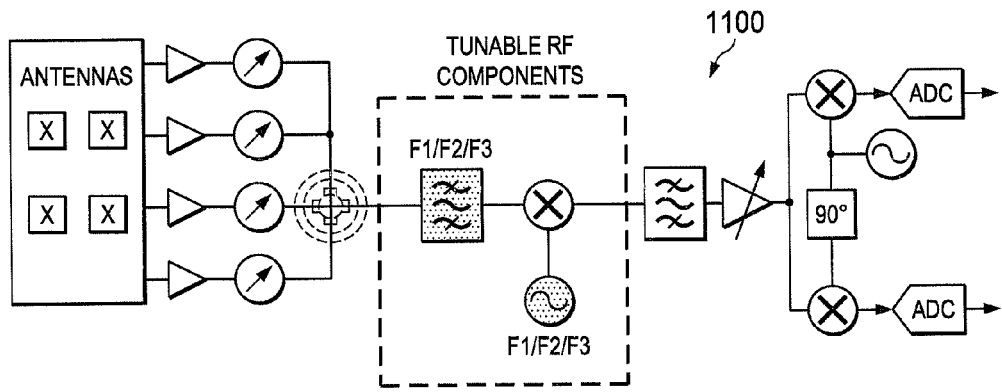
FIG. 11
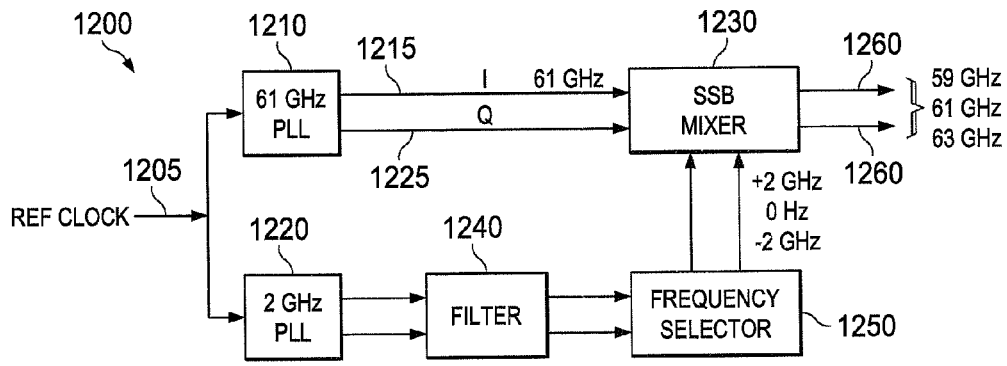
FIG. 12
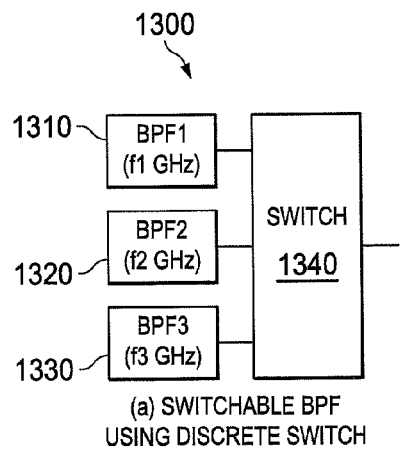
(a) SWITCHABLE BPF
USING DISCRETE SWITCH
FIG. 13A
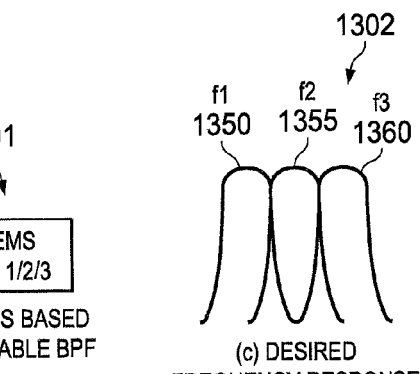
(b) MEMS BASED
SWITCHABLE BPF
FIG. 13B
(c) DESIRED
FREQUENCY RESPONSE
FIG. 13C

APPARATUS AND METHODS FOR FLEXIBLE RF CONFIGURATION IN MULTI-ANTENNA WIRELESS SYSTEMS

CROSS-REFERENCE TO RELATED APPLICATION(S) AND CLAIM OF PRIORITY

The present application claims priority to U.S. Provisional Patent Application Ser. No. 61/661,704, filed Jun. 19, 2012, entitled "APPARATUS AND METHODS FOR FLEXIBLE RF MAPPING FOR ULTRA HIGH THROUGHPUT WIRELESS SYSTEMS". The content of the above-identified patent documents is incorporated herein by reference.

TECHNICAL FIELD

The present application relates generally to wireless communication systems and, more specifically, to wireless communication systems with multiple antennas targeting high data rates exceeding several gigabits per second.

BACKGROUND

Devices using Institute for Electrical and Electronic Engineers (IEEE) 802.11 Wireless Fidelity (Wi-Fi) and/or Wireless Local Area Network (WLAN) connectivity for Internet access communicate in unlicensed bands where spectrum availability is limited.

Wi-Fi data transfer rates have increased over time. WLAN and wireless connectivity solutions have historically tended towards supporting increasing data rates to support new applications. For example, the Wi-Fi standards have evolved from 1 megabits per second (Mb/s) standards in the IEEE 802.11a/b/g family to supporting over 6 gigabits per second (Gb/s) peak rates as shown in IEEE 802.11ad, over the last decade.

SUMMARY

An apparatus includes a baseband signal processing block, processing circuitry, and at least one radio frequency (RF) communication module communicably coupled to the baseband signal processing block and configured to communicate using a selected mode of communication in a channel. The processing circuitry is configured to detect a band of unavailable spectrum (sub-channel) within the channel, the band of unavailable spectrum being less than a whole of the channel. The channel includes one contiguous band of frequencies divisible into at least two non-overlapping non-adjacent sub-channels. The processing circuitry is configured to select one mode of communication selected from a plurality of modes including: a carrier aggregation (CA) only mode, a multiple input multiple output (MIMO) only mode, and a carrier aggregation multiple input multiple output (CA-MIMO) hybrid mode.

A wireless communication system includes a mobile station and an access point configured to transmit a multi-band beacon on different bands within a channel. The mobile station is coupled to the access point. The mobile station calculates a channel quality and channel rank for each of the different bands using the multi-band beacon received on the different bands. The mobile station communicates with the access point according to a selected mode of communication. The selected mode of communication is selected from a plurality of modes including: a carrier aggregation (CA) only mode, a multiple input multiple output (MIMO) only mode, and a carrier aggregation multiple input multiple output (CA-MIMO) hybrid mode.

A method for use in a wireless communication network includes detecting a band of unavailable spectrum (sub-channel) within a channel. The channel includes one contiguous band of frequencies divisible into at least two non-overlapping non-adjacent sub-channels, the band of unavailable spectrum being less than a whole of the channel. The method includes selecting one mode of communication selected from a plurality of modes including: a carrier aggregation (CA) only mode, a multiple input multiple output (MIMO) only mode, and a carrier aggregation multiple input multiple output (CA-MIMO) hybrid mode. The method includes communicating using the one selected mode of communication in the channel.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIG. 11 illustrates a tunable receiver that includes a block for flexible RF support according to embodiments of the present disclosure;

FIG. 12 illustrates a tunable frequency synthesizer operating at 60 GHz according to embodiments of the present disclosure;

FIGS. 13A and 13B each illustrate a tunable bandpass filter (BPF) according to embodiments of the present disclosure;

FIG. 13C illustrates a frequency response of the tunable BPF according to embodiments of the present disclosure;

DETAILED DESCRIPTION

FIGS. 1 through 17, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged wireless communication system.

The following documents and standards descriptions are hereby incorporated into the present disclosure as if fully set forth herein: (i) EE Times Design Article entitled 802.11 ac Wireless LAN: what's new and the impact on design and test by Mirin Lew dated Nov. 9, 2011 (hereinafter "REF1"); (ii) Complete Proposal 10/0433r2 IEEE P802.11ad/D8.0 May 2012 for IEEE 802.1 lad standard entitled Very High Throughput in 60 GHz Physical layers (PHY) and Medium Access Control Layer (MAC) (hereinafter "REF2"); (iii) Proposed TGac Draft Amendment to IEEE 802.11ac Wireless LAN dated Jan. 18, 2011 (hereinafter "REF3"); and (iv) 3GPP LTE-Advanced Release 10 (hereinafter "REF4").

Figure 1:
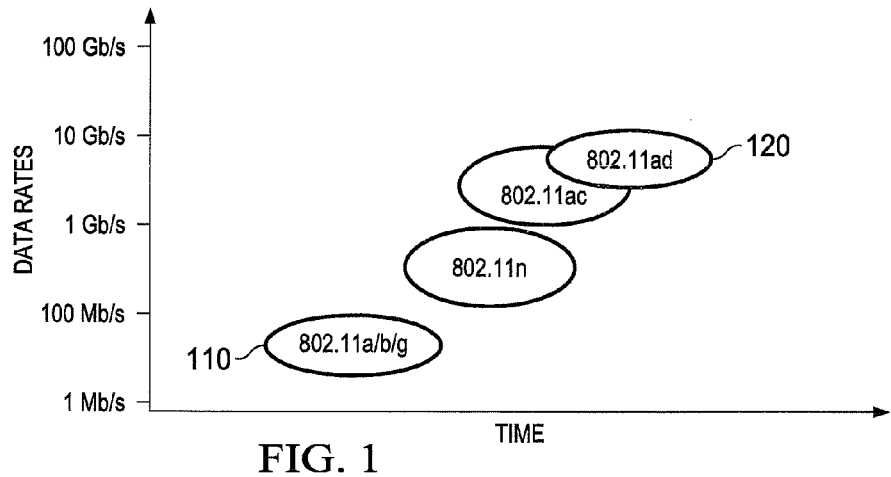
FIG. 1 illustrates a trend of increases in Wi-Fi data transfer rates according to the present disclosure.

FIG. 1 illustrates a trend of increases in Wi-Fi data transfer rates. WLAN and wireless connectivity solutions have historically tended towards supporting increasing data rates to support new applications. The horizontal axis represents time, and the vertical axis represents data rates. The Wi-Fi standards have evolved from 1 megabits per second (Mb/s) standards in the IEEE 802.11a/b/g family (shown in block 110) to supporting over 6 gigabits per second (Gb/s) peak rates as shown in IEEE 802.11ad (shown in block 120) over the last decade.

Figure 2:
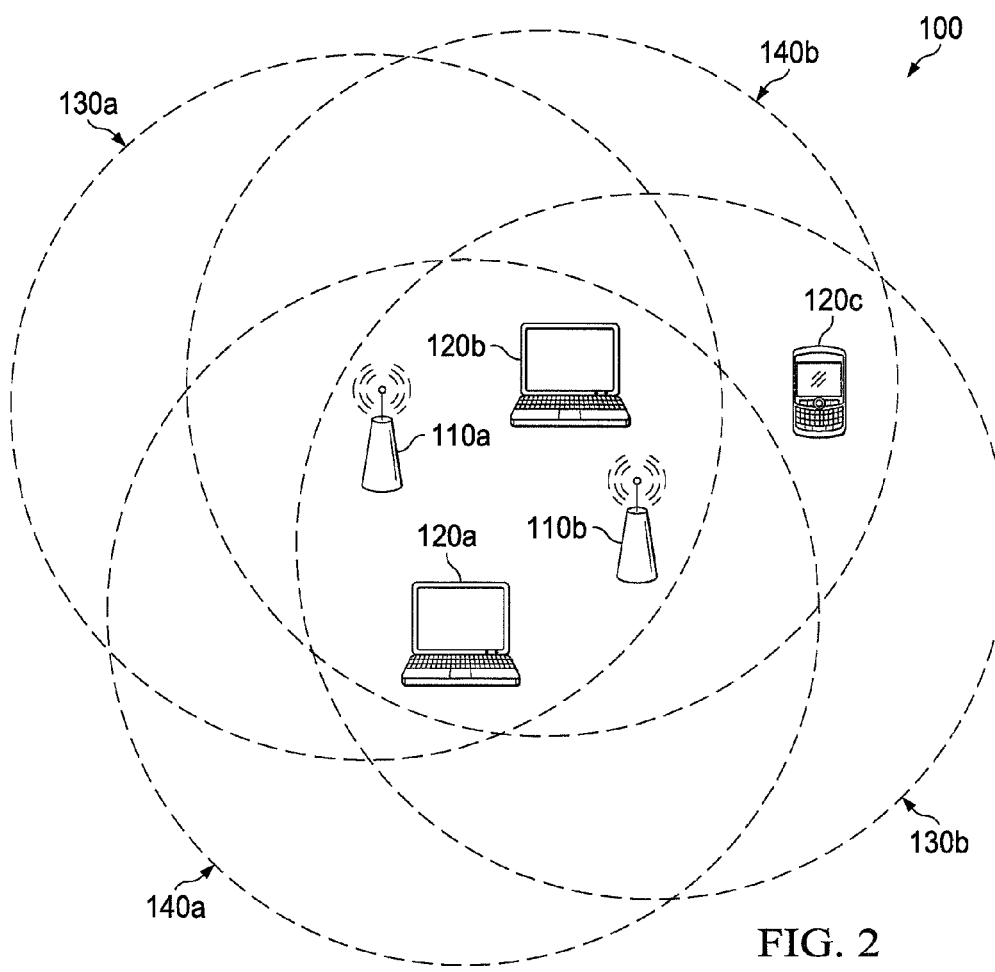
FIG. 2 illustrates a wireless local area network (WLAN) environment according to embodiments of the disclosure.

FIG. 2 illustrates a wireless local area network (WLAN) environment according to embodiments of the disclosure. The embodiment of the WLAN environment shown in FIG. 2 is for illustration only. Other embodiments could be used without departing from the scope of this disclosure.

WLAN environment 100 includes a basic service set (BSS) of an IEEE 802.11 wireless local area network. The BSS includes an access point (AP) 110a that is connected to the Internet (not shown) and a plurality of stations (STAs, also called "nodes" or "clients") 120a and 120b located within coverage area 130a of AP 110a. STAs 120a and 120b are visible to the AP 110a and can communicate with the AP 110a. The reception area 140a is the coverage area of STA 120a, and reception area 140b is the coverage area of station 120b.

In some circumstances, WLAN environment 100 also can include an overlapping BSS including AP 110b that is connected to the Internet and one or more STAs 120c located within the coverage area 130b of AP 110b. As shown, the coverage area 130b of AP 110b overlaps the coverage area 130a of AP 110a. The STAs 120a-120b receive broadcast signals from the APs 110a and 110b. The STA 120c receives broadcast signals from AP 110b, but not AP 110a.

When the coverage area 130a for an AP 110a includes another AP 110b, an overlapping BSS collision scenario may occur in which two APs 110a and 110b attempt to broadcast a signal to a STA 120a, 120b at the same time on the same channel, and as a result the broadcasted signals collide. Neither broadcasted signal will be accurately received by the STA 120a, 120b which instead simply receives a corrupted frame.

Figure 3:
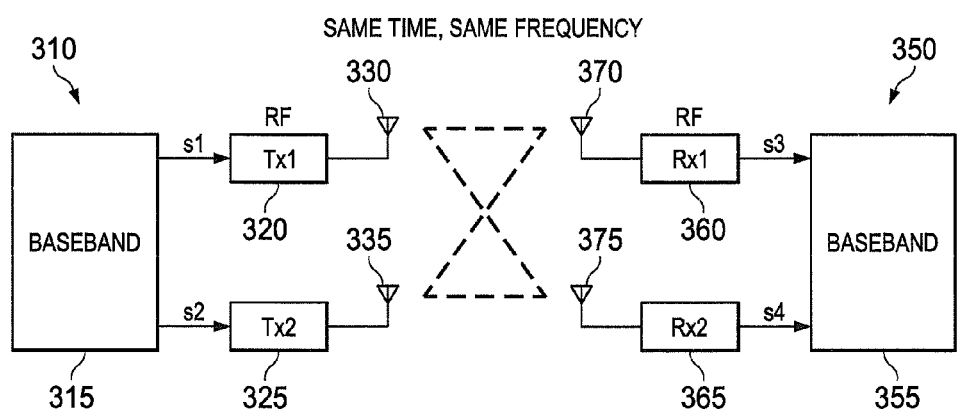
FIG. 3 illustrates a transmitter and a receiver that include multiple input multiple output (MIMO) systems according to the present disclosure.

FIG. 3 illustrates a transmitter 310 and a receiver 350 that include multiple input multiple output (MIMO) systems according to the present disclosure. Although certain details will be provided with reference to the components of the MIMO transmitter 310 and the MIMO receiver 350, it should be understood that other embodiments may include more, less, or different components. Spectrum availability in the unlicensed bands are limited, therefore, there is a need in the art for techniques to improve spectral efficiency in these bands. One technique for improving spectral efficiency is the use of Multiple Input, Multiple Output (MIMO) systems. In MIMO systems, multiple RF chains are used in the transmitter and receiver and the transmissions occur at the same time and frequency. In MIMO communication, both antennas detect uncorrelated channels and hence, have sufficient diversity in order to send and receive multiple streams. MIMO techniques are employed for Wi-Fi starting with IEEE 802.11n standards. MIMO communication achieves increased throughput without any increase in spectrum usage. If the channels stay uncorrelated, linear throughput gains could be achieved with linear increase in both the number of transmitter and receiver chains. For example, the MIMO system in FIG. 3 includes two transmitter and receiver chains, represented by the number of transmit paths of the transmitter 310 and receive paths of the receiver 350.

The MIMO transmitter 310 includes a baseband signal block 315 of processing circuitry, a first RF transmitter 320 (Tx1) coupled to a first antenna 330, a second RF transmitter 325 (Tx2) coupled to a second antenna 335. The baseband signal block 315 transmits a first baseband signal s1 to the first RF transmitter 320. The first RF transmitter 320 uses the first antenna 330 to transmit RF signals to the MIMO receiver 350. The baseband signal block 315 transmits a second baseband signal s2 to the second RF transmitter 325. The second RF transmitter 325 uses the second antenna 335 to transmit RF signals to the MIMO receiver 350.

The MIMO receiver 350 includes a baseband signal block 355 of processing circuitry, a first RF receiver 360 (Rx1) coupled to a first antenna 370, a second RF receiver 365 (Rx2) coupled to a second antenna 375. The baseband signal block 355 receives a first RF signal s3 from the first RF receiver 370.

The first RF receiver 360 uses the first antenna 370 to receive RF signals from the MIMO transmitter 310. The baseband signal block 355 receives a second RF signal s4 from the second RF receiver 365. The second RF receiver 365 uses the second antenna 375 to receive RF signals from the MIMO transmitter 310.

Figure 4A:
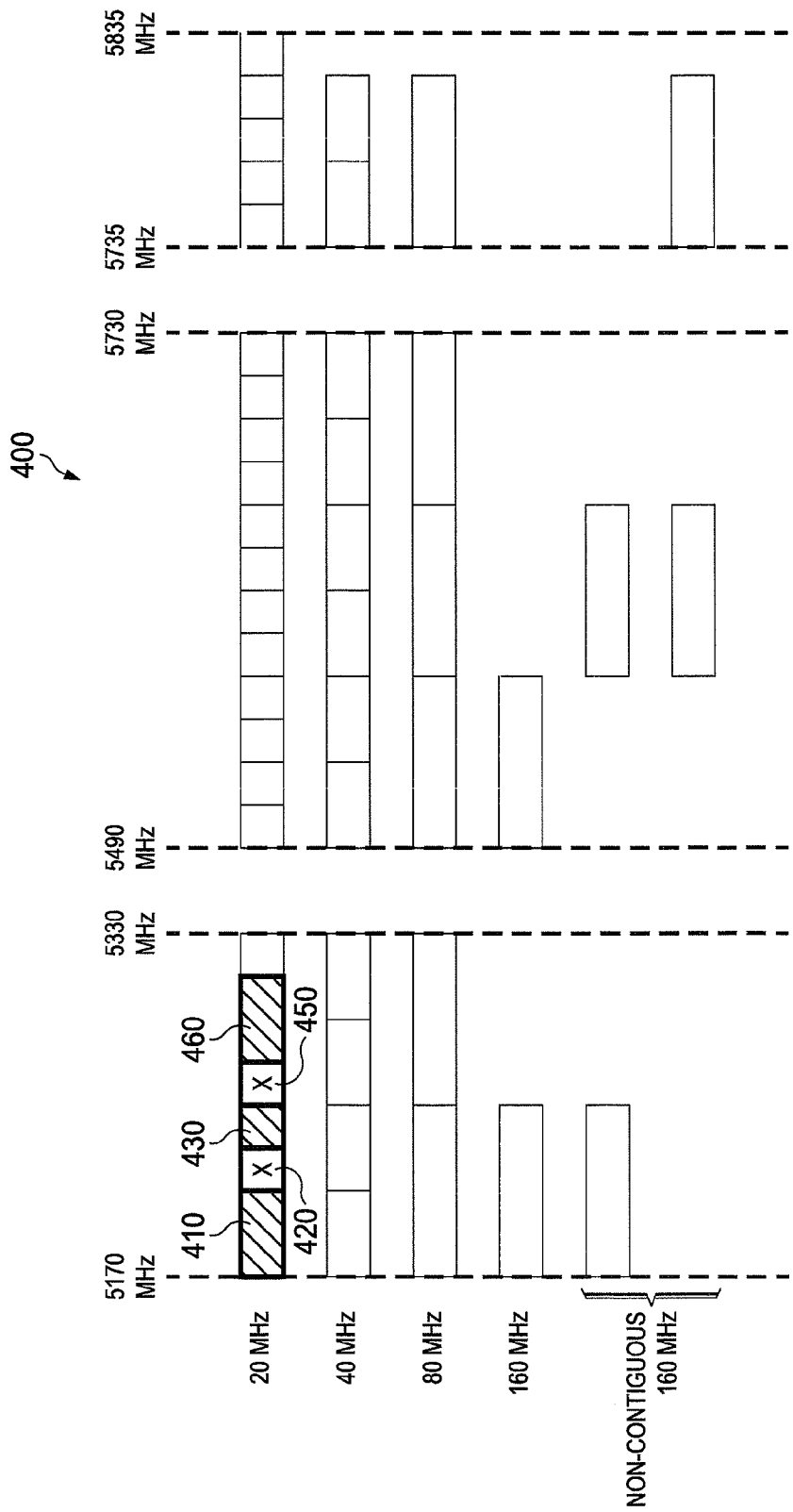
FIG. 4A illustrates a channel bonding method (also referred to as carrier aggregation method) according to the present disclosure.

FIG. 4 illustrates a channel bonding method 400 (also referred to as carrier aggregation (CA) method according to the present disclosure) according to the present disclosure. The embodiment of the channel bonding method 400 shown in FIG. 4 is for illustration only. Other embodiments could be used without departing from the scope of this disclosure. The channel bonding method 400 or technique increases data rates by bonding multiple channels together to increase data rates. The bonded channels can be contiguous or non-contiguous. As a result of channel bonding method 400, data rates increase linearly with a linear increase in spectrum.

As a non-limiting example, a device seeks to transmit data in the 160 MHz band between 5170 MHz and 5330 MHz, but also requires 120 MHz of channel bandwidth for the transmission. The device determines that the 160 MHz channel band is divided into eight 20 MHz sub-channel blocks of spectrum. The first sub-channel block including spectrum from 5170-5190 MHz and the second sub-channel block including spectrum from 5190-5210 MHz are adjacent, contiguous blocks of spectrum available for transmission. The third 20 MHz block 420 including spectrum from 5210-5230 MHz is unavailable. The fourth 20 MHz block including spectrum from 5230-5250 is available. The fifth block 20 MHz block 450 including spectrum from 5250-5270 MHz is unavailable. The sixth 20 MHz block from 52780-5290 MHz, the seventh 20 MHz block from 5290-5310, and the eight 20 MHz block including spectrum from 5310-5330 MHz adjacent, contiguous blocks of spectrum available for transmission.

The MIMO device 600 would not be able to transmit any of the data because 120 MHz channel is not available in a single contiguous block. Similarly also, the CA device 700 would only be able to transmit 40 MHz of data because only the first and second 20 MHz blocks can be aggregated into a single contiguous block before an unavailable block of spectrum is detected in the 160 MHz channel. That is, the CA device 700 can only aggregate adjacent contiguous blocks between the beginning of the channel and the frequency at which unavailability is detected in the third block 420. The CA device 700 could bond the first and second 20 MHz blocks together form a first CA block 410.

A tunable or flexible RF device 900 (described below with reference to FIGS. 9-11) is configured to implement the method 400 of selecting a carrier aggregation and MIMO hybrid mode. The flexible RF device 900 determines that the first and second 20 MHz blocks can be bonded together form a first CA block 410 and implements a 2×2 carrier aggregation in the first CA block 410. The flexible RF device 900 determines that the fourth 20 MHz lock 430 is available, but disposed between unavailable blocks 420, 450 of spectrum. The flexible RF device 900 implements a 2×2 MIMO transmission in the fourth 20 MHz lock 430. The flexible RF device 900 determines that the sixth and seventh 20 MHz blocks can be bonded together form a second CA block 460 and implements a 2×2 carrier aggregation in the second CA block 460. The flexible RF device 900 is not required to select a CA block closes to the beginning of the 160 MHz channel. The flexible RF device 900 can select to implement a 2×2 carrier aggregation by bonding the seventh and eighth 20 MHz blocks. That is, the flexible RF device 900 can adaptively select to implement a combination of CA and MIMO in order to transmit data in a band of spectrum that includes one or multiple blocks of unavailable spectrum.

It is important to note that while the present disclosure includes a description in the context of a fully functional system, those skilled in the art will appreciate that at least portions of the mechanism of the present disclosure are capable of being distributed in the form of instructions contained within a machine-usable, computer-usable, or computer-readable medium in any of a variety of forms, and that the present disclosure applies equally regardless of the particular type of instruction or signal bearing medium or storage medium utilized to actually carry out the process 400. Examples of machine usable, machine readable or computer usable, computer readable mediums include: nonvolatile, hard-coded type mediums such as read only memories (ROMs) or erasable, electrically programmable read only memories (EEPROMs), and user-recordable type mediums such as floppy disks, hard disk drives and compact disk read only memories (CD-ROMs) or digital versatile disks (DVDs).

Figures 4B, 5:
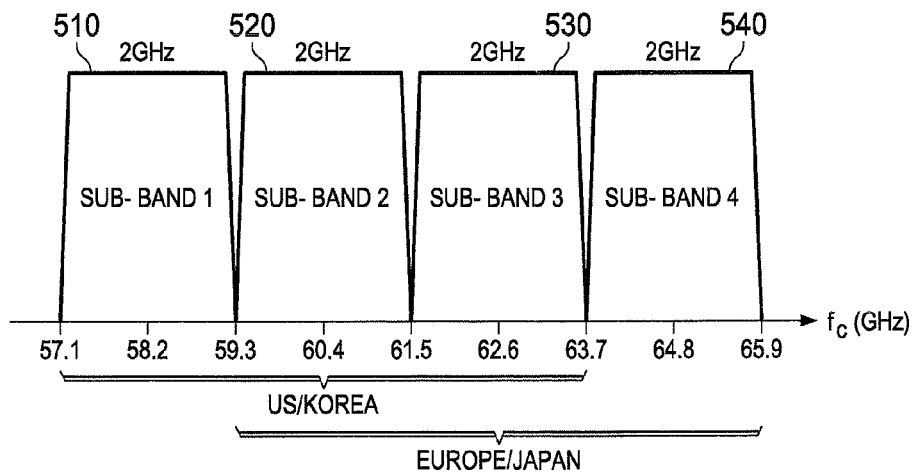
FIG. 4B illustrates a table of data rates that can be achieved using the flexible RF device configuration according to embodiments of the present disclosure.
FIG. 5 illustrates the spectrum allocation for IEEE 802.11ad standard, which an IEEE 802.11 standard focusing on high data rates according to the present disclosure.

FIG. 4B illustrates a table of data rates that can be achieved using the flexible RF device 900 according to embodiments of the present disclosure. For example, the first CA block 410 implementing a 2×2 CA band corresponds to 1 spatial stream with a 40 MHz bandwidth (referenced herein as block 490), which includes a data rate of 200 Mbps. The fourth 20 MHz block 430 implementing a 2×2 MIMO band corresponds to 2 spatial streams with a 20 MHz band width, which includes a data rate of 173.3 Mbps (referenced herein as block 491). The second CA block 460 implementing a 2×2 CA band corresponds to 1 spatial stream with a 40 MHz bandwidth, which includes a data rate of 200 Mbps (referenced herein as block 492). The sum of data rates included in blocks 490, 491, and 492 is 573.3 Mbps with six RF chains.

FIG. 5 illustrates the spectrum allocation for IEEE 802.11ad standard, which an IEEE 802.11 standard focusing on high data rates according to the present disclosure. The 802.11ad standard supports four 2 GHz channels 510, 520, 530, 540, three of which can be used worldwide, and supports up to 6.7 Gb/s. One channel 510 includes spectrum with a carrier frequency ($f_c$) from 57.1 GHz to 59.3 GHz. One channel 520 includes spectrum with a carrier frequency ($f_c$) from 59.3 GHz to 61.5 GHz. One channel 530 includes spectrum with a carrier frequency ($f_c$) from 61.5 GHz to 63.7 GHz. Another channel 540 includes spectrum with a carrier frequency ($f_c$) from 63.7 GHz to 65.9 GHz.

Figure 6:
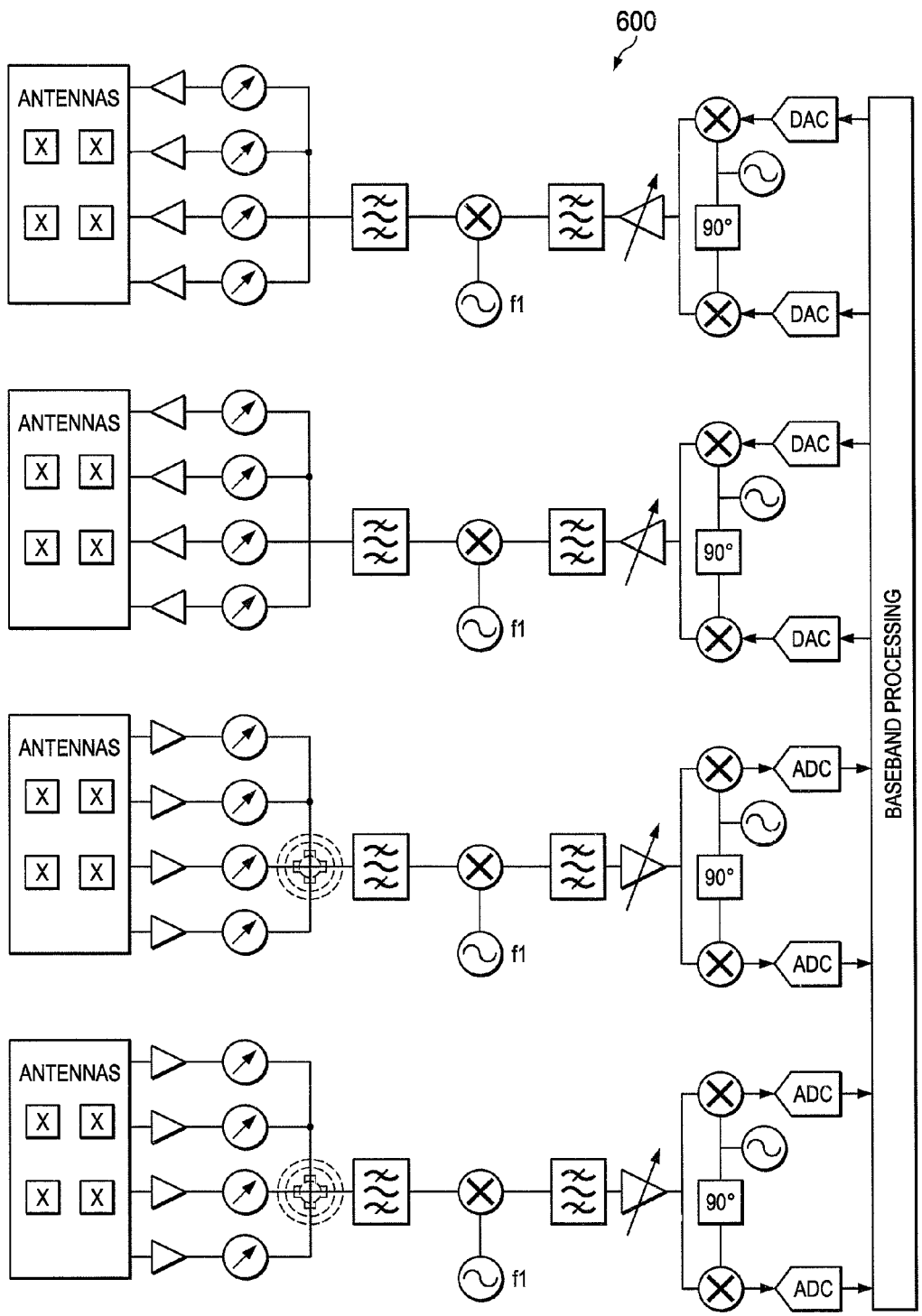
FIG. 6 illustrates a 2×2 MIMO transceiver system configured to double throughput of the system without requiring more spectrum according to the present disclosure.
Figure 7:
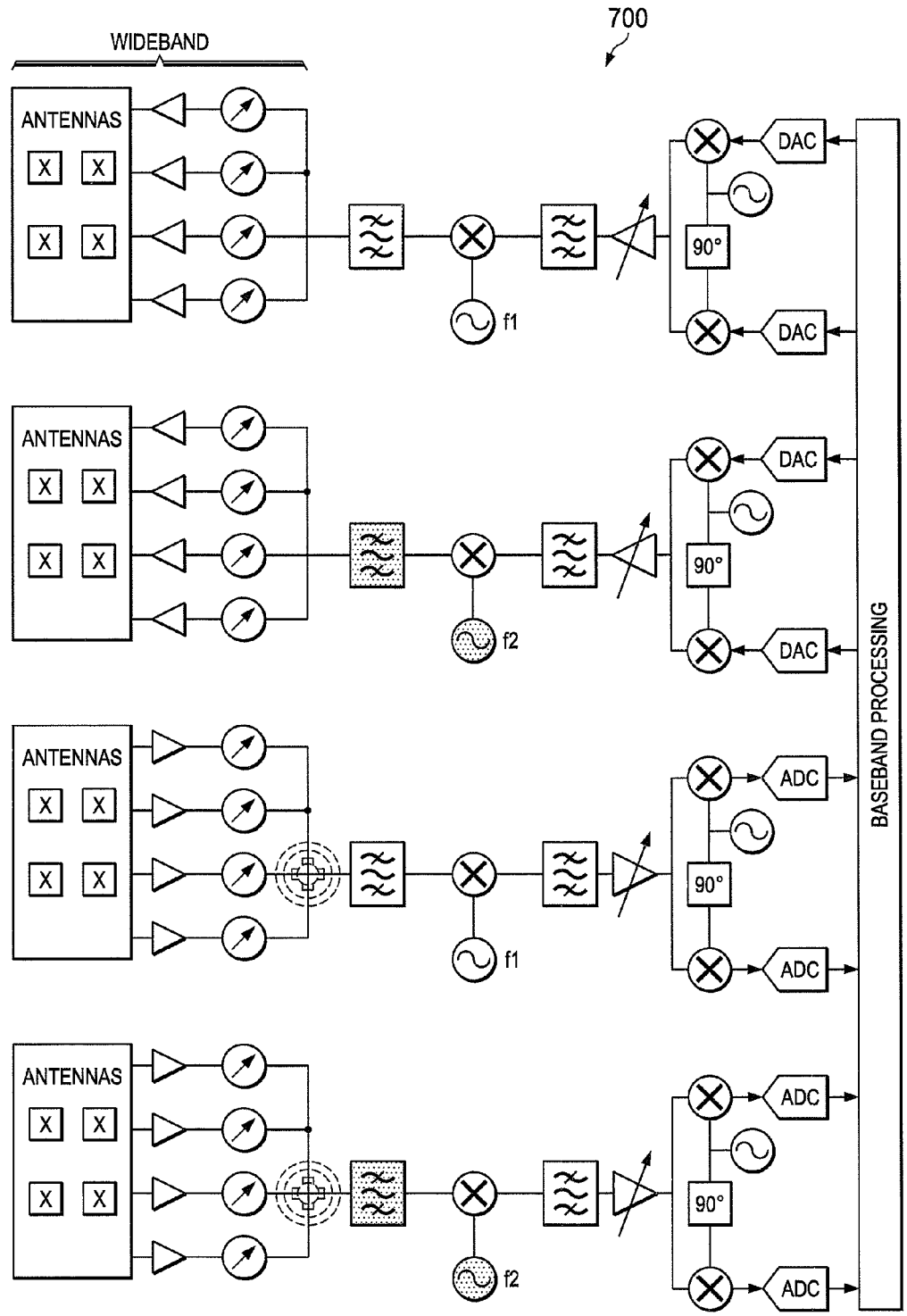
FIG. 7 illustrates a 2×2 carrier aggregation transceiver in the carrier aggregation (CA) mode configured to double throughput of the system according to the present disclosure.

FIGS. 6 and 7 illustrate extensions to improve throughput of the IEEE 802.11ad standard and add support for MIMO and carrier aggregation (CA) to improve throughput. FIG. 6 illustrates a 2×2 MIMO transceiver system 600 configured to double throughput of the system without requiring more spectrum according to the present disclosure. The 2×2 MIMO transceiver system 600 supports both analog beamforming with antenna arrays as well as MIMO digital beamforming with the multiple digital and RF chains. Although certain details will be provided with reference to the components of the 2×2 MIMO transceiver system 600, it should be understood that other embodiments may include more, less, or different components.

The use of MIMO system 600 requires tradeoffs. For example, MIMO requires uncorrelated channels in order to provide throughput gains. For example, if the channel is purely Line-of-Sight (LOS), there cannot be any gain from MIMO. Hence, the amount of gain depends on the channel correlation observed between the multiple transmit and receive chains.

FIG. 7 illustrates a 2×2 carrier aggregation transceiver 700 in the carrier aggregation (CA) mode configured to double throughput of the system according to the present disclosure. The 2×2 transceiver 700 bonds multiple channels together in a CA mode. Although certain details will be provided with reference to the components of the 2×2 transceiver 700, it should be understood that other embodiments may include more, less, or different components.

The use of the CA system 700 requires tradeoffs. CA does not require uncorrelated channels. However, due to limited spectrum, carrier aggregation tends to increase interference, especially in unlicensed spectrum, where it is difficult to coordinate and manage interference. Carrier aggregation also does not improve system throughput as there is little, if any, improvement in spectral efficiency.

Figure 8:
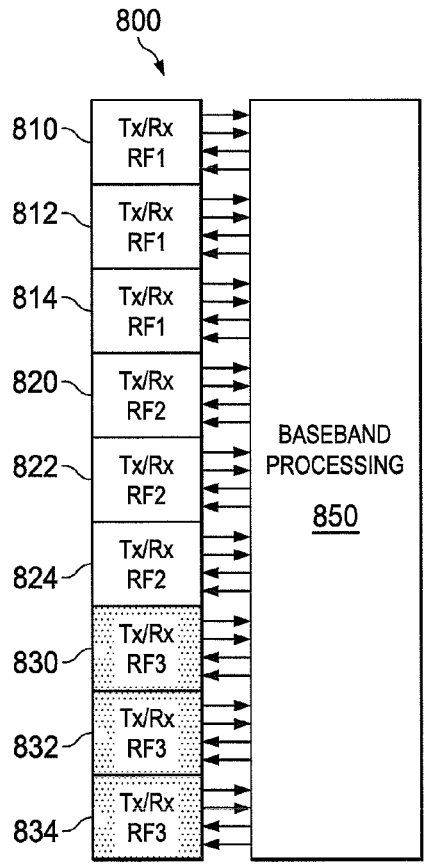
FIG. 8 illustrates a fully configurable RF 3×3 MIMO and 3×3 CA transceiver according to the present disclosure.

FIG. 8 illustrates a fully configurable RF 3×3 MIMO and 3×3 CA transceiver 800 according to the present disclosure. Although certain details will be provided with reference to the components of the transceiver 800, it should be understood that other embodiments may include more, less, or different components. For example, in certain embodiments, the transceiver 800 is a transmitter. In certain embodiments, the transceiver 800 is a receiver.

The transceiver 800 continues the data rate extensions for IEEE 802.11 standards by providing both CA and MIMO support in order to exploit both MIMO within a band and CA across bands. However, at frequencies such as 60 GHz, in order to provide increased data rates, the area and power consumption costs can become quickly unmanageable with an increased number of RF chains. For example, RF 3×3 MIMO and 3×3 CA transceiver 800 implementation provides both MIMO and CA for 3×3 MIMO and 3-band CA and requires nine RF chains 810-834 at the transmitter and at the receiver. The transceiver 800 is an expensive solution in terms of both physical area and power consumption.

When the transceiver 800 is a transmitter, for a first CA band, the baseband signal processing block 850 sends baseband signals to the RF transmitters 810, 812, 814. The RF transmitters 810, 812, 814 (Tx RF1) transmit RF signals to a receiver, such as the transmitter 800. When the transceiver 800 is a receiver, for a first CA band, the baseband signal processing block 850 receives baseband signals from the RF receivers 810, 812, 814 (Rx RF1). The RF receivers 810, 812, 814 (Rx RF1) receive RF signals from a transmitter, such as the transmitter 800.

When the transceiver 800 is a transmitter, for a second CA band, the baseband signal processing block 850 sends baseband signals to the RF transmitters 820, 822, 824. The RF transmitters 820, 822, 824 (Tx RF2) transmit RF signals to a receiver, such as the transmitter 800. When the transceiver 800 is a receiver, for a second CA band, the baseband signal processing block 850 receives baseband signals from the RF receivers 820, 822, 824 (Rx RF2). The RF receivers 820, 822, 824 (Rx RF2) receive RF signals from a transmitter, such as the transmitter 800.

When the transceiver 800 is a transmitter, for a third CA band, the baseband signal processing block 850 sends baseband signals to the RF transmitters 830, 832, 834. The RF transmitters 830, 832, 834 (Tx RF3) transmit RF signals to a receiver, such as the transmitter 800. When the transceiver 800 is a receiver, for a third CA band, the baseband signal processing block 850 receives baseband signals from the RF receivers 830, 832, 834 (Rx RF3). The RE receivers 830, 832, 834 (Rx RF3) receive RF signals from a transmitter, such as the transmitter 800.

Figure 9:
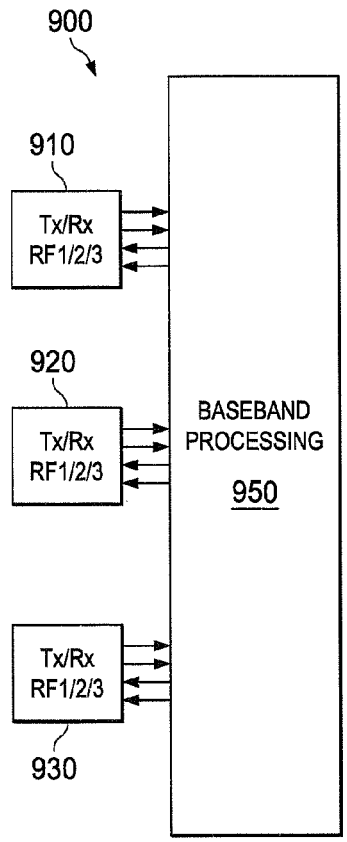
FIG. 9 illustrates a Flexible CA-MIMO RF chain device according to embodiments of the present disclosure.

FIG. 9 illustrates a flexible CA-MIMO RF chain device 900 according to embodiments of the present disclosure. Although certain details will be provided with reference to the components of the device 900, it should be understood that other embodiments may include more, less, or different components. For example, in certain embodiments, the device 900 is a transmitter. In certain embodiments, the device 900 is a receiver. Additionally, in certain embodiments, the device 900 is a transceiver. The Flexible CA-MIMO RF chain device 900 can be reconfigured for CA, for MIMO, or for a hybrid mode that supports both CA and MIMO operation. In certain applications, where full diversity is not available in all bands for MIMO or where interference-free operation is not available for CA, a reconfigurable system provides flexibility to select CA or MIMO based on interference conditions of the channel and channel characteristics, such as the channel rank.

The transceiver 900 continues the data rate extensions for IEEE 802.11 standards by providing CA, MIMO, and hybrid CA-MIMO support in order to exploit both MIMO within a band and CA across bands. The Flexible CA-MIMO RF chain transceiver 900 implementation requires three RF chains 910, 920, 930 at the transmitter and at the receiver.

In order to attain this flexibility in RF, tunable components are needed for the transmitter and receiver of FIG. 9. In particular, the local oscillator (also referred to as frequency synthesizer) is tunable for multiple frequencies and the band pass filter is tuned to multiple bands as well. Some of the other RF components such as low noise amplifiers (LNAs), PAs and phase shifters are typically wideband, yet can be tunable in order to improve performance.

Figure 10:
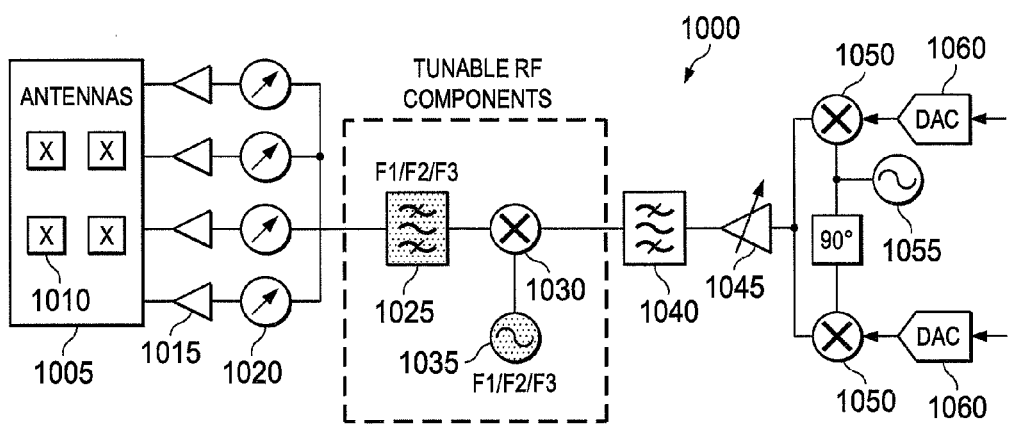
FIG. 10 illustrates a tunable transmitter that includes a block for flexible RF support according to embodiments of the present disclosure.

FIG. 10 illustrates a tunable transmitter 1000 that includes a block for flexible RF support according to embodiments of the present disclosure. Although certain details will be provided with reference to the components of the tunable transmitter 1000, it should be understood that other embodiments may include more, less, or different components. The tunable transmitter 1000 (MIMO, CA) can be reconfigured for CA, for MIMO, or for a hybrid mode that supports both CA and MIMO operation.

The tunable transmitter 1000 can be implemented in the flexible RF device 900. The tunable transmitter 1000 includes an antenna block 1005 including multiple antennas 1010, such as four antennas. In certain embodiments, the antenna block 1005 is configured to tunable antenna polarization.

The tunable transmitter 1000 includes a PA 1020 for each antenna 1005. For example, the tunable transmitter 1000 includes four PAs 1015 for each antenna within the antenna block 1005. Each PA 1015 is coupled to the antenna block. In certain embodiments, each PA 1015 is coupled to an antenna 1010.

The tunable transmitter 1000 includes a phase shifter 1020 for each antenna within the antenna block 1005. That is, each phase shifter 1020 is coupled to and corresponds to a PA 1015 and an antenna 1010.

The tunable transmitter 1000 includes tunable RF components coupled to the phase shifter 1020 and the PA 1015. For example, the tunable RF components include a band pass filter 1025 of a transmitter (Tx BPF). The band pass filter 1025 is configured to tune at least three frequency bands F1, F2, and F3. The tunable RF components include an up-converter 1030 coupled to the BPF 1025. The up-converter 1030 is coupled to a signal generator 1035 that is configured to generate RF signals at multiple frequencies F1, F2, and F3.

The tunable transmitter 1000 includes an IF band pass filter 1040 coupled to the tunable RF components, such as the up-converter 1030. The IF band pass filter is also coupled to a Tx GC 1045. The Tx GC 1045 is coupled to a set of up-converters 1050 connected in parallel. A signal generator 1055 is coupled to and between both up-converters 1050. The tunable transmitter 1000 includes one or more DACs 1060 configured to receive signals and send signals to the up-converters 1050. For example, in certain embodiments, each up-converter 1050 is configured to receive signals from a respective DAC 1060.

FIG. 11 illustrates a tunable receiver 1100 that includes a block for flexible RF support according to embodiments of the present disclosure. Although certain details will be provided with reference to the components of the tunable transmitter 1000, it should be understood that other embodiments may include more, less, or different components. The tunable transmitter 1000 (MIMO, CA) can be reconfigured for CA, for MIMO, or for a hybrid mode that supports both CA and MIMO operation.

FIG. 12 illustrates a tunable frequency synthesizer 1200 operating at 60 GHz according to embodiments of the present disclosure. Although certain details will be provided with reference to the components of the tunable frequency synthesizer 1200, it should be understood that other embodiments may include more, less, or different components. The tunable frequency synthesizer 1200 receives a reference clock signal 1205 and sends the reference clock signal 1205 to a 61 GHz PLL 1210 and to a 2 GHz PLL 1220. The 61 GHz PLL 1210 sends an I signal 1215 and a Q signal 1225 to an SSB Mixer 1230.

The 2 GHz PLL 1220 sends two signals to a filter 1240. In response, the filter sends two filtered signals to a frequency selector 1250. The frequency selector 1250 selects one of multiple frequencies, to send to the SSB mixer 1230. The SSB mixer adds the frequency of the I signal 1215 with the frequency selected by the frequency selector 1250 and outputs the sum of the frequencies.

In certain embodiments, the tunable frequency synthesizer 1200 is tunable for three frequencies. For example at 60 GHz frequency range, a 61 GHz PLL c210 is mixed with a 2 GHz PLL 1220 that is sent to a filter 1240 and frequency selector 1250 that selects one of 3 frequencies (+2, 0, −2 GHz), generating output signals 1260 at 59 GHz, 61 GHz and 63 GHz that could be used for an extension of the 802.11ad standard.

FIGS. 13A and 13B each illustrate a tunable bandpass filter (BPF) according to embodiments of the present disclosure. FIG. 13A illustrates a switchable bandpass filter 1300 according to embodiments of the present disclosure. FIG. 13A illustrates a MEMS based switchable bandpass filter 1301 according to embodiments of the present disclosure. Although certain details will be provided with reference to the components of the tunable bandpass filters 1300-1301, it should be understood that other embodiments may include more, less, or different components.

In certain embodiments, the tunable bandpass filter 1300, 1301 is tunable for three frequencies. For example, at 60 GHz frequency range, the tunable bandpass filter 1300, 1301 is implemented as a switch 1340 between three BPFs 1310, 1320, and 1330.

FIG. 13C illustrates a frequency response 1302 of the tunable BPF 1300, 1301 according to embodiments of the present disclosure. For example, a first curve 1350 corresponds to a first frequency f1 of a first BPF 1310 (BPF1); a second curve 1355 corresponds to a second frequency f2 of a second BPF 1320 (BPF2); and a third curve 1360 corresponds to a third frequency f3 of a third BPF 1330 (BPF3).

Table 1 illustrates a method to configure the flexible CA-MIMO transmitter 900 or receiver 900 (also referred to as tunable CA-MIMO transmitter 1000, tunable CA-MIMO receiver 1100, or tunable CA-MIMO transceiver) in different modes that provide the same peak data rate according to embodiments of the present disclosure. The embodiment of the process shown in Table 1 is for illustration only. Other embodiments could be used without departing from the scope of this disclosure. In the example shown in Table 1, the method to configure the flexible CA-MIMO transmitter 900 or receiver 900 is implemented by a three RF chain system that can operate at carrier frequencies of F1, F2 or F3 independently. The RF chains are configured in MIMO only modes, in CA only modes, or in hybrid modes, based on the channel rank and channel interference.

TABLE 1

Example combinations for 3 RF chains to use MIMO, CA for fixed data rate

| CA-MIMO Mode | F1 | F2 | F3 |
| --- | --- | --- | --- |
| MIMO only | 3x3 MIMO | — | — |
|  | — | 3x3 MIMO | — |
|  | — | — | 3x3 MIMO |
| Hybrid modes | 1x1 | — | 2x2 MIMO |
|  | 1x1 | 2x2 MIMO | — |
|  | — | 1x1 | 2x2 MIMO |
|  | 1x1 | 2x2 MIMO | 1x1 |
|  | 2x2 MIMO | — | 1x1 |
|  | 2x2 MIMO | 1x1 | — |
| CA only | 1x1 | 1x1 | 1x1 |

Table 2 illustrates a method to configure the flexible CA-MIMO transmitter or receiver 900 in different modes that provide diversity and different peak data rates, by including some hybrid modes that enable diversity transmissions according to embodiments of the present disclosure. The embodiment of the process shown in Table 2 is for illustration only. Other embodiments could be used without departing from the scope of this disclosure. Depending on the channel conditions, diversity provides support for higher instantaneous data rates without requiring channel feedback. For example, for low signal to noise ratio (SNR) conditions, diversity modes are preferred.

In Table 2, Space Frequency Block Coded (SFBC) and Space Time Block Coded (STBC) schemes are used as an example. In certain embodiments, other transmit diversity based on cyclic delay diversity (CDD) can also be used. In certain embodiments, multiple transmit diversity schemes are supported, which represent different modes in the table. For the same RF chain configuration, multiple MIMO transmission schemes are supported.

TABLE 2

Example combinations for 3 RF chains to use MIMO, CA for different data rates and diversity

| CA-MIMO Mode | F1 | F2 | F3 |
| --- | --- | --- | --- |
| MIMO only | 3x3 MIMO | — | — |
|  | — | 3x3 MIMO | — |
|  | — | — | 3x3 MIMO |
| Hydrid modes | 1x1 | — | 2x2 MIMO |
|  | 1x1 | 2x2 MIMO | — |
|  | — | 1x1 | 2x2 MIMO |
|  | 1x1 | 2x2 MIMO | 1x1 |
|  | 2x2 MIMO | — | 1x1 |
|  | 2x2 MIMO | 1x1 | — |
|  | 2x1 STBC/SFBC | 1x2 SIMO | — |
|  | — | 2x1 STBC/SFBC | 1x2 SIMO |
|  | 2x1 STBC/SFBC | — | 1x2 SIMO |
| CA only | 1x1 | 1x1 | 1x1 |

Table 3 illustrates a method for both closed loop and open loop transmission schemes to support for MIMO according to embodiments of the present disclosure. The embodiment of the process shown in Table 3 is for illustration only. Other embodiments could be used without departing from the scope of this disclosure. For example, 2×2 MIMO is supported either by using closed loop precoder feedback or by using open loop techniques, such as precoder cycling schemes in combination with large delay CDD (LD-CDD) type schemes (Precoder Cycling+LD-CDD, for example).

In certain embodiments, the applicable supported subset of modes in the tables is explicitly configured by the transmitter signaling. In certain embodiments, the applicable supported subset of modes in the tables is implicitly related to specified parameters. In certain embodiments, the specified parameters include a link SNR measurement similar to a RSRP or a RSSI receive signal strength indicator metrics that can be used for radio resource management (RRM) measurements.

TABLE 3

Example MIMO modes for 3 RF chains to use MIMO, CA for different data rates and diversity

| CA-MIMO Mode | F1 | F2 | F3 |
|---|---|---|---|
| MIMO only | 3x3 MIMO (CL) | — | — |
|  | — | 3x3 MIMO (CL) | — |
|  | — | — | 3x3 MIMO (CL) |
|  | 3x3 MIMO (OL) | — | — |
|  | — | 3x3 MIMO (OL) | — |
|  | — | — | 3x3 MIMO (OL) |
| Hydrid modes | 1x1 | — | 2x2 MIMO |
|  | 1x1 | 2x2 MIMO | — |
|  | — | 1x1 | 2x2 MIMO |
|  | 1x1 | 2x2 MIMO | 1x1 |
|  | 2x2 MIMO | — | 1x1 |
|  | 2x2 MIMO | 1x1 | — |
|  | 2x1 STBC/SFBC | 1x2 SIMO | — |
|  | — | 2x1 STBC/SFBC | 1x2 SIMO |
|  | 2x1 STBC/SFBC | — | 1x2 SIMO |
| CA only | 1x1 | 1x1 | 1x1 |

In Table 4 illustrates a method for MIMO-CA configuration for different data rates and diversity according to embodiments of the present disclosure. The embodiment of the process shown in Table 4 is for illustration only. Other embodiments could be used without departing from the scope of this disclosure. According to embodiments of the present disclosure, the receiving terminal 120a-c may have limited capability (due to cost constraints), in which case a different set of modes apply.

TABLE 4

Example MIMO modes for 3 RF chains at transmitter and 2 RF chains at receiver to use MIMO, CA for different data rates and diversity

| CA-MIMO Mode | F1 | F2 | F3 |
|---|---|---|---|
| MIMO only | 3x2 MIMO (CL) | — | — |
|  | — | 3x2 MIMO (CL) | — |
|  | — | — | 3x2 MIMO (CL) |
|  | 3x2 MIMO (OL) | — | — |
|  | — | 3x2 MIMO (OL) | — |
|  | — | — | 3x2 MIMO (OL) |
| Hybrid modes | 2x1 STBC/SFBC | 1x1 | — |
|  | — | 2x1 STBC/SFBC | 1x1 |
|  | 2x1 STBC/SFBC | — | 1x1 |
| CA only | 1x1 | 1x1 | — |
|  | — | 1x1 | 1x1 |
|  | 1x1 | — | 1x1 |

It is important to note that while the present disclosure includes a description in the context of a fully functional system, those skilled in the art will appreciate that at least portions of the mechanism of the present disclosure are capable of being distributed in the form of instructions contained within a machine-usable, computer-usable, or computer-readable medium in any of a variety of forms, and that the present disclosure applies equally regardless of the particular type of instruction or signal bearing medium or storage medium utilized to actually carry out the processes of Tables 1-4. Examples of machine usable, machine readable or computer usable, computer readable mediums include: nonvolatile, hard-coded type mediums such as read only memories (ROMs) or erasable, electrically programmable read only memories (EEPROMs), and user-recordable type mediums such as floppy disks, hard disk drives and compact disk read only memories (CD-ROMs) or digital versatile disks (DVDs).

Figures 14, 15:
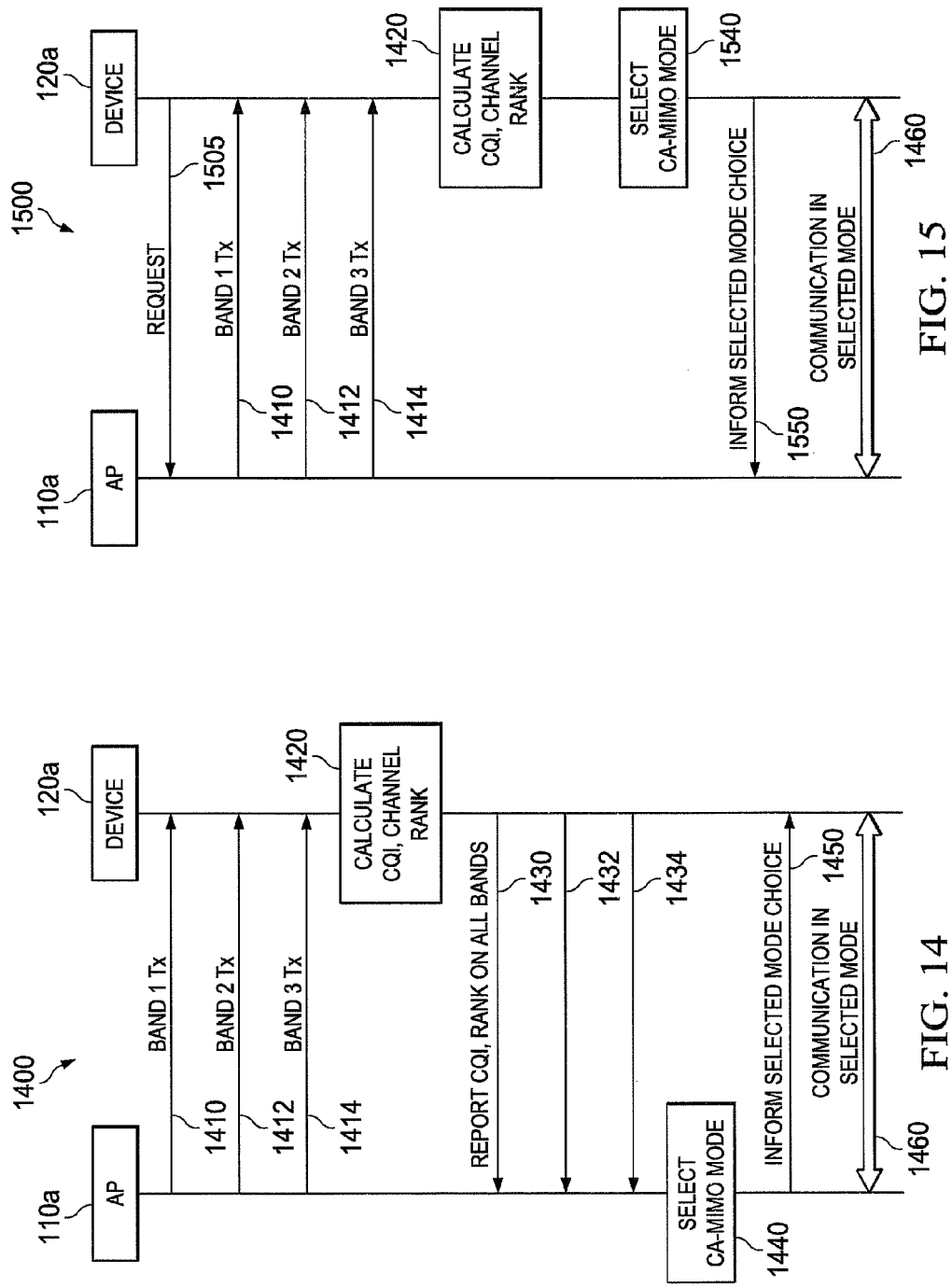
FIGS. 14 and 15 illustrate method a CA-MIMO mode selection in peer-to-peer (P2P) communication according to embodiments of the present disclosure.

FIGS. 14 and 15 illustrate method a CA-MIMO mode selection in peer-to-peer (P2P) communication according to embodiments of the present disclosure. The embodiments of the processes 1400 and 1500 shown in FIGS. 14 and 15 are for illustration only. Other embodiments could be used without departing from the scope of this disclosure. In FIG. 14, the access point (AP) 110a selects the CA-MIMO mode in the P2P communication. In FIG. 15, the mobile station STA device 110a selects the CA-MIMO mode in the P2P communication.

It is important to note that while the present disclosure includes a description in the context of a fully functional system, those skilled in the art will appreciate that at least portions of the mechanism of the present disclosure are capable of being distributed in the form of instructions contained within a machine-usable, computer-usable, or computer-readable medium in any of a variety of forms, and that the present disclosure applies equally regardless of the particular type of instruction or signal bearing medium or storage medium utilized to actually carry out the processes 1400 and 1500. Examples of machine usable, machine readable or computer usable, computer readable mediums include: non-volatile, hard-coded type mediums such as read only memories (ROMs) or erasable, electrically programmable read only memories (EEPROMs), and user-recordable type mediums such as floppy disks, hard disk drives and compact disk read only memories (CD-ROMs) or digital versatile disks (DVDs).

In FIG. 14, the AP 110a sends reference signals 1410, 1412, 1414 to the STA device 120a on different bands (for example, Band 1 Tx, Band 2 Tx, and Band 3 Tx). The STA device 120a receives and uses the reference signals 1410, 1412, 1414 to estimate the channel quality and channel rank. That is, the STA device 120a includes a block 1420 of processing circuitry configured to calculate a channel quality indicator (CQI) and channel rank.

For each reference signal received on a band, the STA device 120a sends report of the channel quality (for example, CQI) and rank. That is, in response to receiving the reference signal 1410 on Band 1 Tx, the STA device 120a calculates a CQI and channel rank based on the received reference signal 1410. Then, the STA device 120a sends a report 1430 including a CQI and channel rank of the Band 1 Tx to the AP 110a. Accordingly, the STA device 120a sends a report 1432 including a CQI and channel rank of the Band 2 Tx to the AP 110a; and the STA device 120a sends a report 1434 including a CQI and channel rank of the Band 3 Tx to the AP 110a.

The AP 110a selects the CA-MIMO mode of operation based on these received reports 1430, 1432, and 1434. That is, the AP 120*a* includes a block 1440 of processing circuitry configured to select a CA-MIMO mode according to embodiments of the present disclosure. In certain embodiments, the block 1440 uses one or more of Tables 1-4 to select a CA-MIMO mode.

In response to the selection of a CA-MIMO mode of operation, the AP 110*a* transmits a signal 1450 to the STA device 120*a* indicating the selected CA-MIMO mode. Upon receipt of the signal informing the device 120*a* of the selected CA-MIMO mode, the AP 110*a* and the STA device 120*a* start communication 1460 with each other according to the selected mode.

FIG. 15 illustrates the CA-MIMO mode selection method 1500 implemented by the STA device 110*a* according to embodiments of the present disclosure. According to the method 1500, the STA device 120*a* sends a request 1505 to the AP 110*a* to initiate communication on a selected mode.

In response to receiving the request signal 1505, the AP 110*a* sends reference signals 1410, 1412, 1414 to the STA device 120*a* on different bands (for example, Band 1 Tx, Band 2 Tx, and Band 3 Tx). The STA device 120*a* receives and uses the reference signals 1410, 1412, 1414 to estimate the channel quality and channel rank. That is, the STA device 120*a* includes a block 1420 of processing circuitry configured to calculate a channel quality indicator (CQI) and channel rank.

For each reference signal received on a band, the STA device 120*a* generates a report of the channel quality (for example, CQI) and rank. That is, in response to receiving the reference signal 1410 on Band 1 Tx, the STA device 120*a* calculates a CQI and channel rank based on the received reference signal 1410. The STA device 120*a* generates a report including a CQI and channel rank of the Band 1 Tx, a report including a CQI and channel rank of the Band 2 Tx, and a report including a CQI and channel rank of the Band 3 Tx.

The STA device 120*a* selects the CA-MIMO mode of operation based on the reports generated. That is, the STA device 120*a* includes a block 1540 of processing circuitry configured to select a CA-MIMO mode according to embodiments of the present disclosure. In certain embodiments, the block 1540 uses one or more of Tables 1-4 to select a CA-MIMO mode.

In response to the selection of a CA-MIMO mode of operation, the STA device 120*a* transmits a signal 1550 to the AP 110*a* indicating the selected CA-MIMO mode. Upon receipt of the signal 1550 informing the AP 110*a* of the selected CA-MIMO mode, the AP 110*a* and the STA device 120*a* start communication 1460 with each other according to the selected mode.

Figure 16:
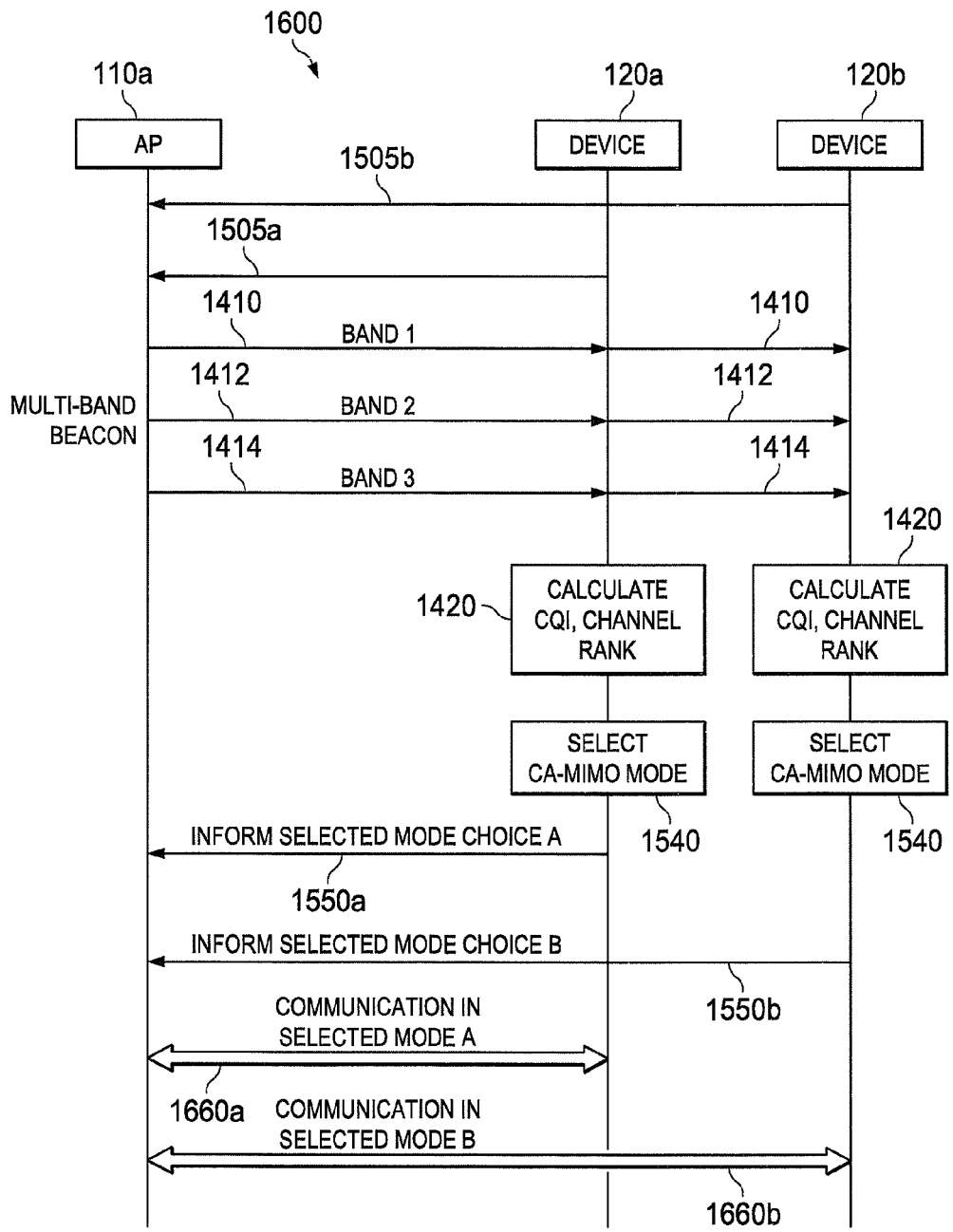
FIG. 16 illustrates a method of CA-MIMO mode selection in a peer-to-multipoint (P2MP) communication according to embodiments of the present disclosure.

FIG. 16 illustrates a method 1600 of CA-MIMO mode selection in a peer-to-multipoint (P2MP) communication according to embodiments of the present disclosure. The embodiment of the CA-MIMO mode selection process 1600 shown in FIG. 16 is for illustration only. Other embodiments could be used without departing from the scope of this disclosure. According to the method 1600, the AP 110*a* is configured for two-way communication with multiple devices in a time division multiple access (TDMA) fashion. That is, the AP 110*a* communicates with the STA device 120*a* and the STA device 120*b*.

According to the method 1600, the STA device 120*a* sends a request 1505*a* to the AP 110*a* to initiate communication on a first selected mode (A). Also, the STA device 120*b* sends a request 1505*b* to the AP 110*a* to initiate communication on a second selected mode (B).

The access point 110*a* sends a reference signal, such as a multi-band beacon, to all the devices in its coverage area 130*a* on different bands. For example, in response to receiving the request signals 1505*a-b*, the AP 110*a* sends reference signals 1410, 1412, 1414 to the STA devices 120*a-b* on different bands (for example, Band 1 Tx, Band 2 Tx, and Band 3 Tx). Each STA device 120*a* and 120*b* receives and uses the reference signals 1410, 1412, 1414 to estimate the channel quality and channel rank. That is, each STA device 120*a-b* includes a block 1420 of processing circuitry configured to calculate a channel quality indicator (CQI) and channel rank.

The STA devices 120*a-b* use the received reference signals 1410, 1412, 1414, to estimate the channel quality and channel rank. For each reference signal received on a band, the STA device 120*a* generates a report of the channel quality (for example, CQI) and rank. That is, in response to receiving the reference signal 1410 on Band 1 Tx, the STA device 120*a* calculates a CQI and channel rank based on the received reference signal 1410. The STA device 120*a* generates a report including a CQI and channel rank of the Band 1 Tx, a report including a CQI and channel rank of the Band 2 Tx, and a report including a CQI and channel rank of the Band 3 Tx.

Each device 120*a-b* selects the CA-MIMO mode of operation based on the reports generated. That is, each STA device 120*a-b* includes a block 1540 of processing circuitry configured to select a CA-MIMO mode according to embodiments of the present disclosure. In certain embodiments, the block 1540 selects a CA-MIMO mode according to one or more of the Tables 1-4. For example, the first STA device 120*a* selects a mode A and the second STA device 120*b* selects mode B.

In response to the selection of a CA-MIMO mode of operation, each STA device 120*a-b* transmits a signal 1550*a-b* to the AP 110*a* indicating the selected CA-MIMO mode. The STA device 120*a* sends a signal 1550*a* to the AP 120*a* indicating the selected mode choice A; and STA device 120*b* sends a signal 1550*b* to the AP 120*a* indicating the selected mode choice B.

Upon receipt of the signals 1550*a-b* informing the AP 110*a* of the selected CA-MIMO mode, the AP 110*a* and the STA devices 120*a-b* start communication 1460 with each other according to the selected mode. The AP 110*a* changes the selected mode when it switches between the different devices. More particularly, during a first time period, the AP 110*a* communicates 1660*a* with STA device 120*a* according to the selected mode A. During another time period, the AP 110*a* communicates 1660*b* with STA device 120*b* according to the selected mode B. In certain embodiments, the AP 110*a* communicates 1660*a* with STA device 120*a* according to the selected mode A and at the same time communicates 1660*b* with the STA device 120*b* according to the selected mod B.

It is important to note that while the present disclosure includes a description in the context of a fully functional system, those skilled in the art will appreciate that at least portions of the mechanism of the present disclosure are capable of being distributed in the form of instructions contained within a machine-usable, computer-usable, or computer-readable medium in any of a variety of forms, and that the present disclosure applies equally regardless of the particular type of instruction or signal bearing medium or storage medium utilized to actually carry out the process 1600. Examples of machine usable, machine readable or computer usable, computer readable mediums include: nonvolatile, hard-coded type mediums such as read only memories (ROMs) or erasable, electrically programmable read only memories (EEPROMs), and user-recordable type mediums such as floppy disks, hard disk drives and compact disk read only memories (CD-ROMs) or digital versatile disks (DVDs).

Figure 17:
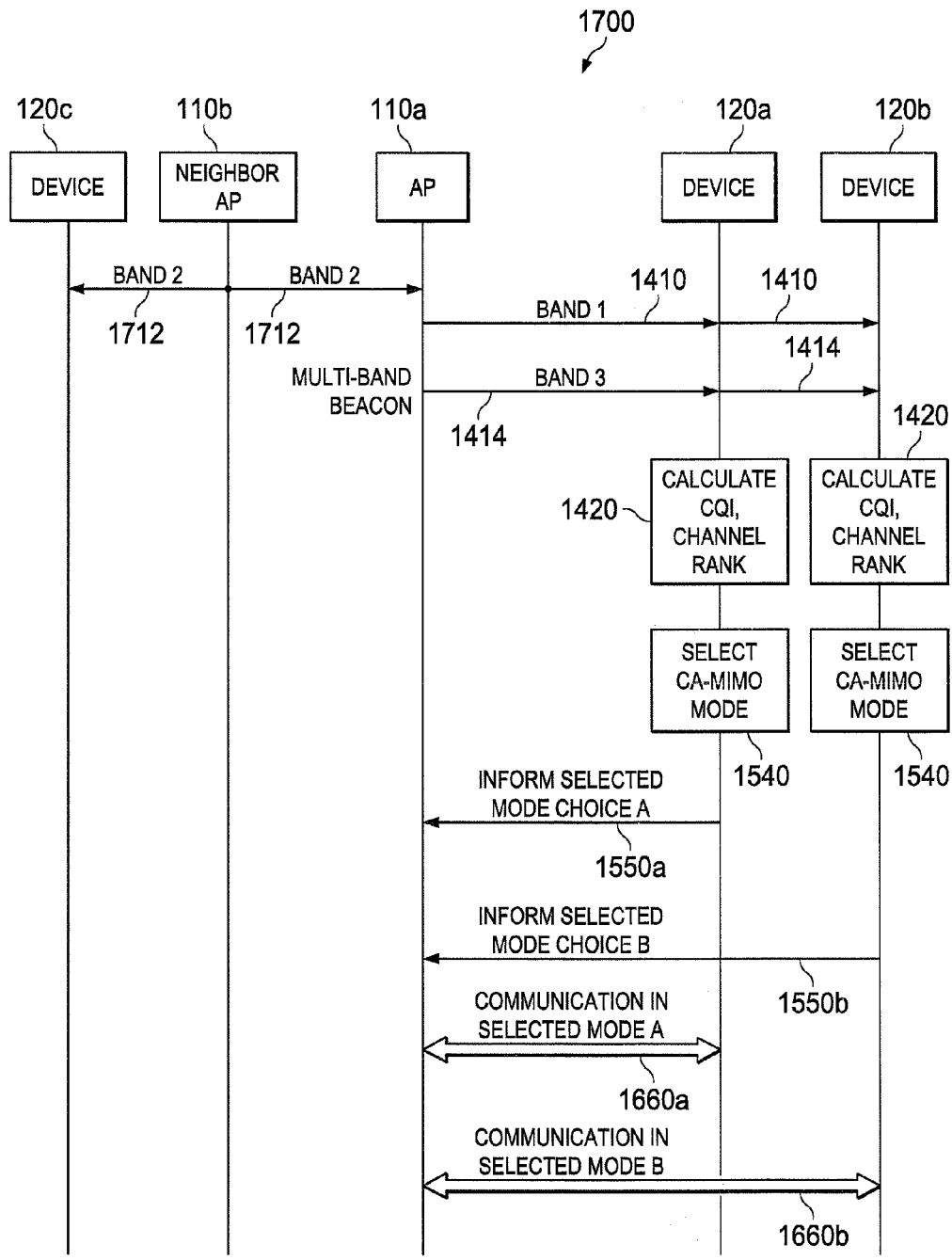
FIG. 17 illustrates a method of CA-MIMO mode selection using adaptive multiple-band beacons according to embodiments of the present disclosure.

FIG. 17 illustrates a method 1700 of CA-MIMO mode selection using adaptive multiple-band beacons according to embodiments of the present disclosure. The embodiment of the CA-MIMO mode selection process 1700 shown in FIG. 17 is for illustration only. Other embodiments could be used without departing from the scope of this disclosure.

The method 1700 for MIMO-CA configuration mitigates interference issues by using knowledge of interference to restrict the CA modes of operation. According to embodiments of the method 1700, the AP 110a listens to neighboring APs to determine which bands are in operation. That is, the AP 110a is configured to receive beacon broadcasts of neighboring APs, such as the overlapping AP 110b disposed within the coverage area 130a of the AP 110a. Beacon signals broadcasted from the neighboring AP 110b can collide with signals transmitted from AP 110a to the STA devices 120a and 120b within the coverage area 130a, unless the AP 110a obtains knowledge of the band(s) in use by the neighboring AP 110b. To obtain knowledge of the bands in use by neighboring AP 110b, the AP 110a receives the reference signal 1712 transmitted from the neighboring AP 110b to the receivers and transceiver devices within the coverage area 130b, namely the STA devices 120b-c and the AP 110. The AP 110a uses the reference signal 1712 to determine whether the Band 2 is susceptible to interference. The AP 110a includes processing circuitry configured to determine a level of susceptibility to interference of a channel or band in use by another AP 110b.

Based on the determination of interference susceptibility, when the AP 110a sends a multi-band beacon, the multi-band beacon (such as reference signals 1410 and 1414) does not include a beacon on bands that are susceptible to interference. That is, upon a determination by the AP 110a that Band 2 (used for communication between AP 110b and STA 120c) is susceptible to interference, AP 110a does not send a reference signal 1412 on Band 2. These bands determined to be too susceptible to interference are automatically removed from the CA-MIMO modes of operation. That is, the AP 110a selects other CA-MIMO modes from the set of bands not overburdened with interference, in order to communicate with the STA devices 120a and 120b. In certain embodiments, the AP 110a deletes the interference laden Band 2 from the multi-band beacon list, and transmits a multi-band beacon only on Bands 1 and 3 (such as reference signals 1410 and 1414). The AP 110a is configured to automatically filter the CA-MIMO mode selection list to remove interference laden bands.

In certain embodiments, the AP 110a and the STA device 120a or 120b is configured to select an antenna polarization at the same time as and in addition to selecting the CA-MIMO mode. The AP 110a and the STA device 120a or 120b is configured to search to find the best CA-MIMO-polarization mode combination that provides the best performance.

In certain embodiments of the present disclosure, the signal used to indicate the selected CA-MIMO mode includes channel coding across the various CA-MIMO mode combinations in order to achieve coding gains on in addition to the CA-MIMO operating gains.

In certain embodiments, the synchronization occurs in parallel on multiple bands during the beacon transmission in order to provide better synchronization because the delay spread between the multiple bands is expected to be similar. For example, the AP 110a synchronizes to communicate with device 120a according to selected mode A on a first band while at the same AP 110a synchronizes to communicate with device 120b according to selected mode B on a second band different from the first band.

In certain embodiments, a carrier is configured as a primary carrier for a receiver. In such a case the receiver performs synchronization based on the primary carrier.

In certain embodiments, control information for a receiver is transmitted only on a primary carrier. Such control information can indicate one or more parameters for decoding-demodulation at the UE (also referred to as STA) including a configured MIMO+CA transmission mode and the carriers on which the MIMO+CA transmission is to be sent and other information related to coding and modulation. For example, when the coding is performed across carriers, modulation and coding scheme is performed per carrier.

Certain embodiments of the present disclosure include an apparatus to flexibly configure the system 900 to support either CA or MIMO or both schemes in a hybrid fashion by reconfiguring the RF communication module (also referred to as a transmitter, a receiver, a transceiver, or a transmitter-receiver).

Certain embodiments of the present disclosure include a method to use the channel rank, quality and interference information to as a basis to determine the mode to be selected for operation.

Certain embodiments of the present disclosure include a system using the above method and apparatus to provide ultra high data rates (in excess of 10 Gb/s, for example) at mmWave frequency bands such as 60 GHz, for example.

It is important to note that while the present disclosure includes a description in the context of a fully functional system, those skilled in the art will appreciate that at least portions of the mechanism of the present disclosure are capable of being distributed in the form of instructions contained within a machine-usable, computer-usable, or computer-readable medium in any of a variety of forms, and that the present disclosure applies equally regardless of the particular type of instruction or signal bearing medium or storage medium utilized to actually carry out the process 1700. Examples of machine usable, machine readable or computer usable, computer readable mediums include: nonvolatile, hard-coded type mediums such as read only memories (ROMs) or erasable, electrically programmable read only memories (EEPROMs), and user-recordable type mediums such as floppy disks, hard disk drives and compact disk read only memories (CD-ROMs) or digital versatile disks (DVDs).

Although various features have been shown in the figures and described above, various changes may be made to the figures. For example, the size, shape, arrangement, and layout of components shown in FIGS. 1 through 3 and 5 through 13C are for illustration only. Each component could have any suitable size, shape, and dimensions, and multiple components could have any suitable arrangement and layout. Also, various components in FIGS. 1 through 3 and 5 through 13C could be combined, further subdivided, or omitted and additional components could be added according to particular needs. Further, each component in a device or system could be implemented using any suitable structure(s) for performing the described function(s). In addition, while TABLES 1-4 and FIGS. 4 and 14 through 17 illustrate various series of steps, various steps in FIGS. 4 and 14 through 17 could overlap, occur in parallel, occur multiple times, or occur in a different order.

Although an exemplary embodiment of the present disclosure has been described in detail, those skilled in the art will understand that various changes, substitutions, variations, and improvements disclosed herein may be made without departing from the spirit and scope of the disclosure in its broadest form.

None of the description in the present application should be read as implying that any particular element, step, or function is an essential element which must be included in the claim scope: the scope of patented subject matter is defined only by the allowed claims. Moreover, none of these claims are intended to invoke paragraph six of 35 USC §112 unless the exact words "means for" are followed by a participle.

What is claimed is:

1. For use in a wireless communication network, an apparatus comprising:
a baseband signal processing block configured to communicate baseband signals with at least one RF communication module;
processing circuitry configured to:
detect a sub-channel band of unavailable spectrum within a channel, the channel including one contiguous band of frequencies divisible into at least two non-overlapping non-adjacent sub-channels, the band of unavailable spectrum being less than a whole of the channel, and
select one mode of communication selected from a plurality of modes, the plurality of modes comprising:
a carrier aggregation (CA) only mode,
a multiple input multiple output (MIMO) only mode, and
a carrier aggregation multiple input multiple output (CA-MIMO) hybrid mode; and
the at least one radio frequency (RF) communication module communicably coupled to the baseband signal processing block and configured communicate using the one selected mode of communication in the channel.

2. The apparatus as set forth in claim 1, wherein the RF communication module comprises an access point.

3. The apparatus as set forth in claim 1, wherein the RF communication module comprises a mobile station.

4. The apparatus as set forth in claim 1, wherein the at least one RF communication module is further configured to:
in response to a detection of at least one sub-channel band of available spectrum within the channel at a different carrier frequency than the sub-channel band of unavailable spectrum, communicate data using a carrier aggregation method in the at least one sub-channel band of available spectrum within the channel at a different carrier frequency than the band of unavailable spectrum.

5. The apparatus as set forth in claim 1, wherein the at least one RF communication module is further configured to:
in response to:
a detection of at least two sub-bands of available spectrum within the channel, and
a selection of the CA-MIMO hybrid mode,
communicate data using a carrier aggregation method in the at least one of the at least two sub-bands of available spectrum and using a MIMO access method in another of the at least one of the at least two sub-bands of available spectrum.

6. The apparatus as set forth in claim 1, wherein the processing circuitry is further configured to select one mode of communication based on an interference level of the channel and a rank of the channel.

7. The apparatus as set forth in claim 1, further comprising:
a band pass filter configured to filter each sub-channel in the channel; and
a local oscillator configured to synthesize multiple frequencies.

8. The apparatus as set forth in claim 1, wherein the at least one RF communication module is further configured to receive a signal indicating the selected one mode of communication.

9. A wireless communication system comprising:
a mobile station configured to:
couple to an access point configured to transmit a multi-band beacon on different bands within a channel;
calculate a channel quality and channel rank for each of the different bands using the multi-band beacon received on the different bands, and
communicate with the access point according to a selected mode of communication, wherein the selected mode of communication is selected from a plurality of modes, the plurality of modes including:
a carrier aggregation (CA) only mode,
a multiple input multiple output (MIMO) only mode, and
a carrier aggregation multiple input multiple output (CA-MIMO) hybrid mode.

10. The wireless communication system as set forth in claim 9, wherein the mobile station is further configured to receive a signal indicating the selected mode of communication, based on a report sent from the mobile station, the report comprising the a channel quality and channel rank for each of the different bands.

11. The wireless communication system as set forth in claim 9, wherein one of the access point and the mobile station are configured to:
in response to:
a detection of at least two sub-channels of available spectrum and a sub-channel of unavailable spectrum within the channel, and
a selection of the CA-MIMO hybrid mode,
communicate data using a carrier aggregation method in the at least one of the at least two sub-bands of available spectrum and using a MIMO method in another of the at least one of the at least two sub-bands of available spectrum.

12. The wireless communication system as set forth in claim 11, wherein the at least two sub-bands of available spectrum comprises at least two non-overlapping non-adjacent sub-bands.

13. The wireless communication system as set forth in claim 9, wherein the mode of communication is selected based on the calculated channel quality and the rank of the channel.

14. The wireless communication system as set forth in claim 9 further comprising a second mobile station configured to:
couple to the access point configured to transmit a multi-band beacon on different bands within a channel;
calculate a channel quality and channel rank for each of the different bands using the multi-band beacon received on the different bands, and
communicate with the access point according to a second selected mode of communication, wherein the second selected mode of communication is selected from the plurality of modes.

15. The wireless communication system as set forth in claim 14, wherein the second mobile station communicates with the access point at a different time than the mobile station.

16. The wireless communication system as set forth in claim 9, wherein the access point is configured to:
in response to determining that level of susceptibility to interference of a band within the channel is above a predetermined value, not transmit the multi-band beacon on the interference susceptible band.

17. For use in a wireless communication network, a method comprising:
   detecting a band of unavailable spectrum within a channel, the channel including one contiguous band of frequencies divisible into at least two non-overlapping non-adjacent sub-channels, the band of unavailable spectrum being less than a whole of the channel;
   selecting one mode of communication selected from a plurality of modes, the plurality of modes including:
      a carrier aggregation (CA) only mode,
      a multiple input multiple output (MIMO) only mode, and
      a carrier aggregation multiple input multiple output (CA-MIMO) hybrid mode; and
   communicating using the one selected mode of communication in the channel.

18. The method as set forth in claim 17, further comprising:
   in response to detecting at least one sub-channel band of available spectrum within the channel at a different carrier frequency than the sub-channel band of unavailable spectrum, communicating data using a carrier aggregation method in the at least one band of available spectrum within the channel at a different carrier frequency than the band of unavailable spectrum.

19. The method as set forth in claim 17, further comprising:
   in response to detecting at least two sub-bands of available spectrum within the channel and selecting the CA-MIMO hybrid mode, communicating data using a carrier aggregation method in the at least one of the at least two sub-bands of available spectrum and using a MIMO method in another of the at least one of the at least two sub-bands of available spectrum.

20. The method as set forth in claim 17, further comprising selecting one mode of communication based on an interference level of the channel and a rank of the channel.

21. The method as set forth in claim 17, wherein the access point is further configured to transmit the multi-band beacon from at least one antenna.

* * * * *